(12) United States Patent
Harris

(10) Patent No.: US 9,395,606 B1
(45) Date of Patent: Jul. 19, 2016

(54) EXTERNAL FLASH DEVICE FOR MOBILE DEVICES

(71) Applicant: Geoffrey Herbert Harris, Chicago, IL (US)

(72) Inventor: Geoffrey Herbert Harris, Chicago, IL (US)

( * ) Notice: Subject to any disclaimer, the term of this patent is extended or adjusted under 35 U.S.C. 154(b) by 0 days.

(21) Appl. No.: 14/820,740

(22) Filed: Aug. 7, 2015

(51) Int. Cl.
  *G03B 15/05* (2006.01)
  *G03B 17/56* (2006.01)

(52) U.S. Cl.
  CPC ............. *G03B 17/565* (2013.01); *G03B 15/05* (2013.01)

(58) Field of Classification Search
  CPC ......... G03B 15/02; G03B 15/03; G03B 15/05
  See application file for complete search history.

(56) References Cited

U.S. PATENT DOCUMENTS

| | | | | |
|---|---|---|---|---|
| 3,750,550 A * | 8/1973 | Kasemeier | ............... | G03B 9/70 396/169 |
| 4,100,590 A * | 7/1978 | Wagensonner | ........ | G03B 15/03 362/16 |
| 4,185,905 A * | 1/1980 | Lewis, Jr. | ............... | G03B 15/03 396/190 |
| 4,298,907 A * | 11/1981 | Holt, Jr. | ................. | G03B 15/03 362/18 |
| 9,110,355 B1 * | 8/2015 | Nourbakhsh | .......... | G03B 15/05 |
| 2013/0120636 A1 * | 5/2013 | Baer | ...................... | G03B 15/05 348/335 |

* cited by examiner

*Primary Examiner* — W B Perkey
(74) *Attorney, Agent, or Firm* — Banner & Witcoff, Ltd.

(57) ABSTRACT

Apparatuses and systems are provided for enabling a user to connect an external flash device to a mobile device, such as a smartphone or tablet. Non-conductive tips may be provided, either as an integrated component of a housing of an external flash device or via an adaptor receiving region and adaptor. The availability of different tips and/or adaptors enables the user to utilize multiple accessories (e.g., a microphone) in combination with the external flash. The non-conductive tips may be 3.5 millimeter audio jacks or Universal Serial Bus (USB) type male connectors or device/manufacturer specific connectors. The non-conductivity of the tip prevents power from being drawn from the mobile device, improving the battery life of the mobile device. Power may be provided to the external flash device from a replaceable or rechargeable battery. An adaptor configured to receive a conductive tip and provide a non-conductive tip is also disclosed.

17 Claims, 6 Drawing Sheets

EXTERNAL FLASH DEVICE FOR MOBILE DEVICES

BACKGROUND

Mobile devices, such as smartphones and tablets, are becoming increasingly popular. One common feature on such devices is a camera for the capturing of still images or video images. Many devices now have more than one camera, with one mounted on the "front" of the mobile device (e.g., the side with the primary display screen), and a second mounted on the "back" of the mobile device. The primary application for the "back" camera is to record video or images of people, places, or events to which the user of the mobile device is an audience (e.g., family gatherings, concerts, sporting events, landscapes and scenes of nature, or the like). The primary application for the "front" camera is to record video or images of the user or a group of individuals around the user, for example, for a self-portrait or during a video call.

Although mobile device cameras are popular for capturing video or still images, their usefulness is limited by their ability to capture quality images, especially when there is low or no ambient light. Many smartphone manufacturers have added flash devices as a component of the smartphone. These flash devices artificially illuminate the environment or user, but the output of such mobile device-embedded flash devices may be inadequate to illuminate certain scenes. Some manufacturers have developed attachable external illumination or flash devices, which provide increased illumination beyond that of the "internal" mobile device flash device. These devices use bright white light emitting diodes (LEDS), and plug into the 3.5 mm audio in/out port to supply power thereto.

SUMMARY

The following summary is for illustrative purposes only, and is not intended to limit or constrain the detailed description. The following summary merely presents various described aspects in a simplified form as a prelude to the more detailed description provided below.

Several problems with external flash devices have been observed. First, the attachable flash device requires power. In some instances, the device draws power from the mobile device, either to operate or to recharge an internal battery. This may drain power from the mobile device battery. As some situations requiring an external flash are at night (e.g., low-ambient light outdoor conditions, night clubs, or the like), the mobile device battery may be low (e.g., because the user charges the mobile device overnight and has not had an opportunity to charge the battery of the mobile device since earlier in the day). A user may be reluctant to sap power from their mobile device battery by attaching the external flash device. Compounding the power problems, external flash device manufacturers might not design the power circuitry of the external flash device to react to low battery conditions in the mobile device, and a user's mobile device battery may be completely drained by an overzealous external flash device charging its battery.

A second observed problem is that mobile device manufacturers, particularly smartphone manufacturers, may change one or more dimensions of the device (e.g., height, width, length, thickness or the like) or one or more locations of ports (e.g., moving a data port, power adaptor port or audio port from one location on the device to another location on the device, such as from the top to the bottom of the device). An external flash device may be designed for a particular model of mobile devices or class of mobile devices (e.g., an external flash device only for 3.5 mm ports located on the top of the device, an external flash device only for APPLE IPHONE devices, or SAMSUNG GALAXY devices). A user may encounter difficulty, if not outright incompatibility, when moving an external flash device from one mobile device to a second mobile device, even when purchasing a new mobile device from the same manufacturer.

A third observed problem is that external flash devices occupying the 3.5 mm audio input/output port deprive the user of the ability to use headphones and/or microphones. A user recording a video in a low-light condition requiring a microphone and/or headphones must choose between poor video quality or poor audio quality, and a user experience will suffer as a result.

Accordingly, one or more aspects presented herein are directed to the above problems and to other problems that will be apparent upon reading of the following description. An external flash device compatible with one or more mobile devices may be provided. The external flash device may comprise an internal power source. In some aspects, the internal power source may be a replaceable battery (e.g., a CR 2032 battery). In some aspects, the internal power source may be a rechargeable battery (e.g., a lithium-based or nickel-based rechargeable battery). The external flash device may comprise a non-conductive jack or non-conductive male connector, which may be inserted in the corresponding receptor or female connector located on the mobile device. In some aspects, the non-conductive tip may be molded as part of the plastic housing holding the flash components (the LED bulbs). In some aspects, the non-conductive jack may be a 3.5 mm audio jack. In some aspects, the non-conductive male connector may be a Universal Serial Bus (USB) connector. Furthermore, in some aspects the non-conductive male connector may be a micro-USB connector.

In some aspects, the housing may be manufactured in two parts, a first component which includes the jack as part of its moulding, and a second component which includes an opening in a surface to accept a portion of the jack included on the first component.

Additionally or alternatively, an external flash device may comprise an adaptor receiving region. The adaptor receiving region may be configured to accept one of a plurality of adaptors. Each adaptor may include a non-conductive jack or non-conductive male connector, which may be insertable in a corresponding receptor or female connector located on the mobile device. In some aspects, the jack or connector may be moulded as part of the adaptor. In some aspects, the non-conductive jack may be a 3.5 mm audio jack. In some aspects, the non-conductive male connector may be a Universal Serial Bus (USB) connector. Furthermore, in some aspects the non-conductive male connector may be a micro-USB connector.

In another aspect, a non-conductive tip may be positioned to extend from a first surface of an adaptor. The non-conductive tip may be dimensioned for insertion into and frictional engagement with a port of a mobile device. The adaptor may also include a port located on a second surface opposite from the first surface. The port may be dimensioned to receive a tip positioned on a housing of an external flash device.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
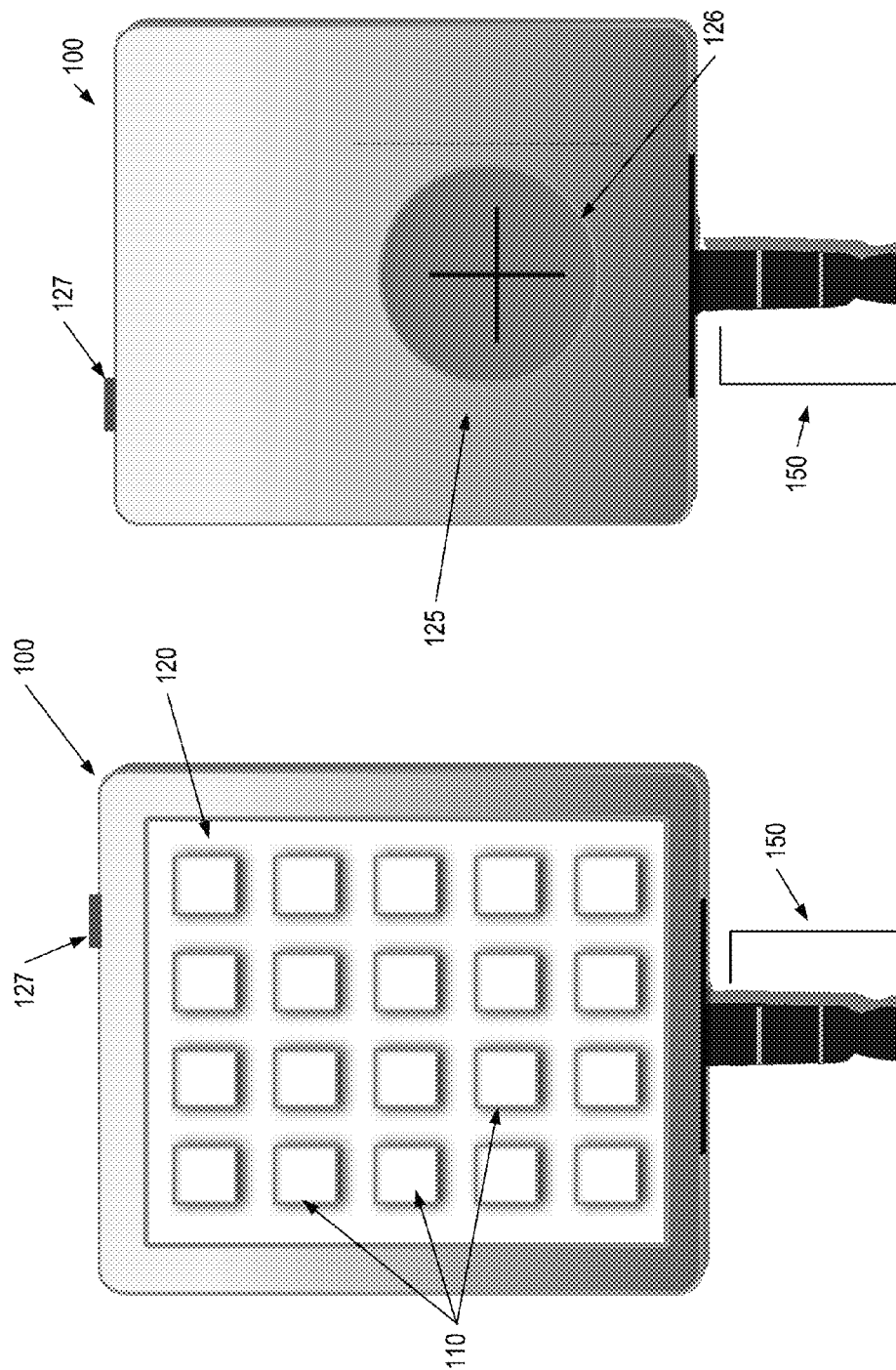
FIG. 1A and FIG. 1B depict a front view and a rear view, respectively, of an exemplary external flash device according to one or more aspects described herein.

FIG. 1A and FIG. 1B illustrate an exemplary external flash device 100 according to one or more aspects described herein, with a front view depicted in FIG. 1A and a rear view depicted in FIG. 1B. An external flash device 100 may comprise one or more light sources 110, which may be in some aspects light emitting diodes (LEDs). As depicted in FIG. 1, the light sources 110 may be arranged in a grid format (e.g., an m by n matrix). For example, as shown in FIG. 1A, a grid may include twenty light sources arranged in a four by five matrix, but other configurations (e.g., four by four, two by two, three by three, three by five) are possible and within the scope of the present disclosure. The light sources may be planar (e.g., surface mounted LEDs, rectangular-dimensioned LEDs) and/or may be three-dimensional (e.g., "lamp-type" LEDs affixed via leads). Light sources 110 may emit light in one direction (e.g., unidirectional) or multiple directions (e.g., omnidirectional) A reflector 120 may be provided to direct light away from the surface of the external flash device 100. Additionally, glass or translucent plastic may be placed over the light sources to protect the light sources from damage and/or to modulate the output of the light sources (e.g., via focusing or diffusing the output of the light sources).

The light sources may be connected to circuitry (not shown) which may control the power and/or operation, including output, of the light sources. The circuitry may be controlled by a controller via one or more physical control inputs (e.g., switches, knobs, touch-based inductive and/or capacitive inputs, or the like) such as toggle 127. Additionally and/or alternatively, the circuitry may be controlled wirelessly (e.g., via commands or instructions received via a wireless transceiver, such as a BLUETOOTH transceiver, including commands received from operation of an application running on a mobile device). In some aspects, the controller may be optional, as for example, where a physical control input toggled by the user causes completion of a circuit, enabling the flow of current from a power source to the light sources. In such an example, a variable resistor controllable by the user may be arranged so as to modulate the power received at the light sources, and accordingly control the output of the light sources.

The external flash device may also comprise an internal power source, such as a battery 126. In some aspects, the internal power source may be user-accessible via a compartment door 125 on the rear surface of the device 100. In some aspects, the internal power source might not be user-accessible, and as a result compartment door 125 might not be present. In some aspects, the shape and size of compartment door may be different from that depicted in FIG. 1B.

The internal power source may be a replaceable battery, such as (for example) a circular-shaped CR-2032 battery, or may be a cylindrical-shaped AAA-cell battery. In some aspects, the battery may be chargeable or rechargeable. For example, the battery may be a lithium-based (e.g., lithium-ion) battery, or the battery may be a nickel-based (e.g., nickel-cadmium) battery. A battery may be chargeable by connecting the external flash device via a wire, cord, cable, or the like to an external power source via a power connector present on the housing of the external flash device (not shown).

The above-discussed components, along with other components, may be stored in a housing 140. Housing 140 may be formed from plastic, such as a thermoplastic (e.g., acrylonitrile butadiene styrene (ABS), polycarbonate, polylactic acid (PLA or polylactide), polyethylene (including high-density, medium-density, low-density, or other formations of polyethylene), polyvinyl chloride, polypropylene, or other like plastics and/or thermoplastics. Housing 140 may be formed via any type of injection moulding, three-dimensional printing, or other similar manufacturing process.

The external flash device may include a non-conductive tip 150. In some aspects, a non-conductive tip may be configured to not allow or transmit signals, such as power or communication signals between the circuitry of the device 100 and another device. Although the exemplary tip 150 illustrated in FIGS. 1A and 1B is in the shape of a cylindrical tip-ring-sleeve (TRS) connector having a 3.5 millimeter (mm) diameter, such exemplary tip 150 is only one of many possibilities. Other examples, not shown with respect to FIG. 1, include tip-sleeve (TS) connectors and tip-ring-ring-sleeve (TRRS) connectors of various diameters (e.g., 6.35 mm, 2.5 mm, or the like), Universal Serial Bus (USB) connectors (USB-A, USB-B, USB-C, microUSB, miniUSB, or the like), or connectors specific to and/or commonly associated with a device or manufacturer of devices (e.g., the 30-Pin connectors or Lightning connectors found on devices manufactured by APPLE INCORPORATED, or the like). The shape and dimensions of any type of tip, jack, male connector, or so on, which may be positionable in a corresponding receptor, port, input, female connector or so on located on the mobile device may be used.

Upon insertion into a female connector or port located on the mobile device, tip 150 may engage frictionally with the sidewalls of the female connector or port, enabling a temporary coupling with of housing 140 and tip 150 with the body of the mobile device. The frictional engagement may be overcome upon presentation of a force to the housing 140/tip 150 to remove the tip 150 from the female connector or port of the mobile device. The non-conductive tip might not allow the external flash device 100 to draw power from the mobile device and might not facilitate communication between the components of the external flash device 100 and the mobile device.

Housing 140 and tip 150 may be manufactured as part of a single process or series of processes. Although housing 140 and tip 150 are depicted to be different colors in FIGS. 1A and 1B, in some aspects housing 140 and tip 150 may be the same color. In some aspects, the housing may be manufactured as a shell having a first piece and a second piece, which may be formed separately and coupled together (temporarily or permanently) after one or more flash device components (e.g, circuitry, light sources) are positioned within the shell. The coupling may be by way of frictional engagement, press-fitting, or other affixing mechanisms (e.g., screws, glue, thermoforming of plastic, and so on). In some aspects, the tip may be formed separately and placed within an opening of one of the housing shell components such that the tip or a portion thereof extends beyond the housing surface. When the first and second pieces of shell are positioned together, portions of the tip may extend through a hole formed by the positioning of openings located on the first and second pieces.

The tip and housing may be formed from different materials and/or plastics. For example, a first material may be selected for reflective or heat-resistant properties to form the body of the housing, as the light sources may emit heat or it may be desirous to reflect light emitting therefrom. A second material may be selected for frictional or hardness properties to form the non-conductive tip, which may assist the tip 150 to engage frictionally with the female connector or port of the mobile device without breaking, as stresses on the tip may develop in use of the mobile device with the external flash device attached.

In some aspects, tip 150 may be molded as part of the plastic housing holding the flash components (the LED bulbs), either during the manufacturing process of the housing prior to assembly of the external device (e.g., by forming the plastic housing to comprise the tip 150) or as part of a post-manufacturing finishing step (e.g., attaching the tip 150 to a completed housing by gluing, affixing, soldering, thermoforming plastic, or the like). As above, the housing may be manufactured in pieces as shell components, one or more of which may include the tip 150 or portions thereof. For example, a first piece of the housing having the tip 150 may be formed. A second piece of the housing may be formed which may be joined (temporarily or permanently) after placement of one or more flash device components (e.g., the light sources) within an internal compartment or compartments formed by the housing pieces. In some aspects, the tip formed as part of the first piece of housing may overlap with a recess or groove in the second piece designed and positioned for accepting the overlap. In some aspects, the tip may be divided and portions may be formed on both a first and second piece (e.g., a front piece and a back piece) so that, when the first and second pieces are coupled, the tip portions of each are also coupled, which may form a tip having dimensions allowing the tip to be accepted into a port, female connector, or the like on the mobile device.

Figure 2:
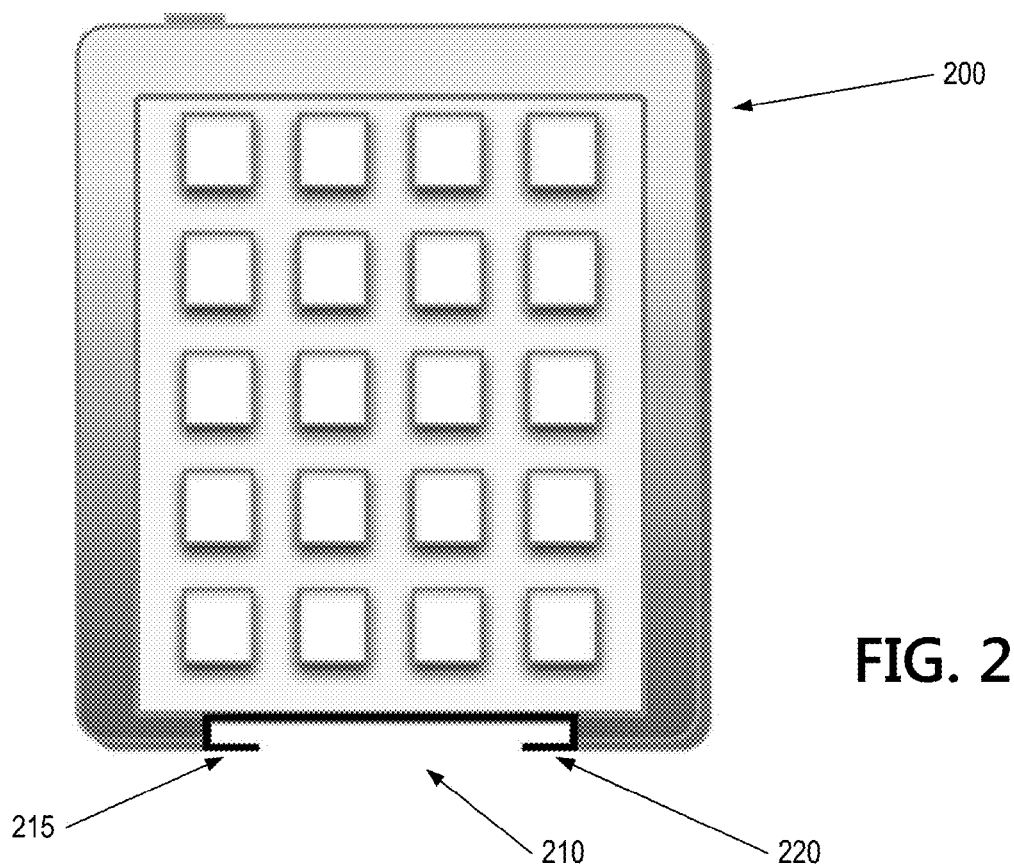
FIG. 2 depicts a front view of an exemplary external flash device according to one or more aspects described herein.

FIG. 2 depicts a front view of another external flash device 200 according to one or more aspects described herein. The external flash device 200 includes similar light source components and control components as discussed above with respect to the external flash device of FIGS. 1A and 1B, and reference is made to the above discussion regarding such components. However, the external flash device 200 comprises an adaptor receiving region 210. Although the adaptor receiving region 210 is depicted as having a largely square or rectangular form, other shapes of adaptor receiving regions 210 are within the scope of the present disclosure. For example, the adaptor receiving region 210 may be ellipsoidal, circular, triangular, or any other shape. Adaptor receiving region 210 may include left groove 215 and right groove 220.

Figure 3:
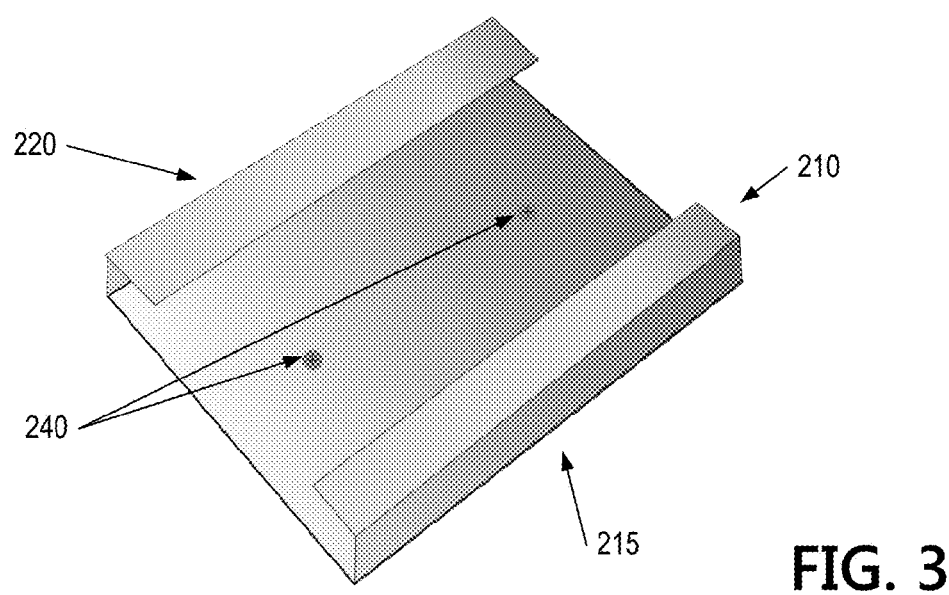
FIG. 3 depicts an isometric view of an example coupling according to one or more aspects described herein.

FIG. 3 presents an isometric view of adaptor receiving region 210, viewed from the bottom of the external flash device 200. Illustrative screws 240 may affix the adaptor receiving region 210 to a housing 260 of the external flash device. In some aspects, illustrative screws 240 are optional. For example, the housing 260 may be plastic and formed (e.g., thermoformed) or moulded to include the adaptor receiving region 210. In some aspects, other coupling (e.g., glue, epoxy, resin, or the like) may be used in place of screws 240 to affix adaptor receiving region 210 with housing 260.

Figure 4C:
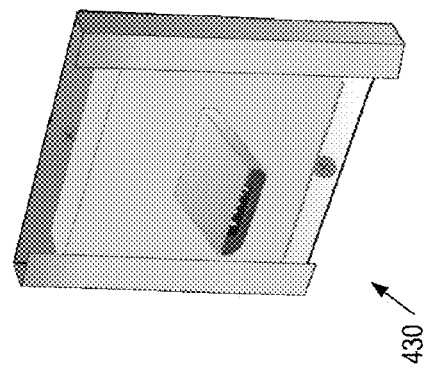
FIGS. 4A-C illustrates an system of positioning an example adaptor tip in the coupling of FIG. 3 according to one or more aspects described herein.
Figure 4B:
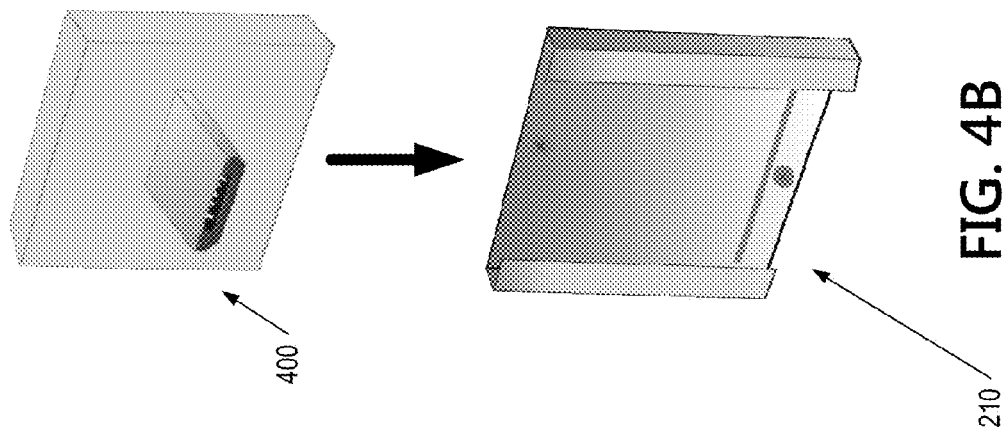
Figure 4A:
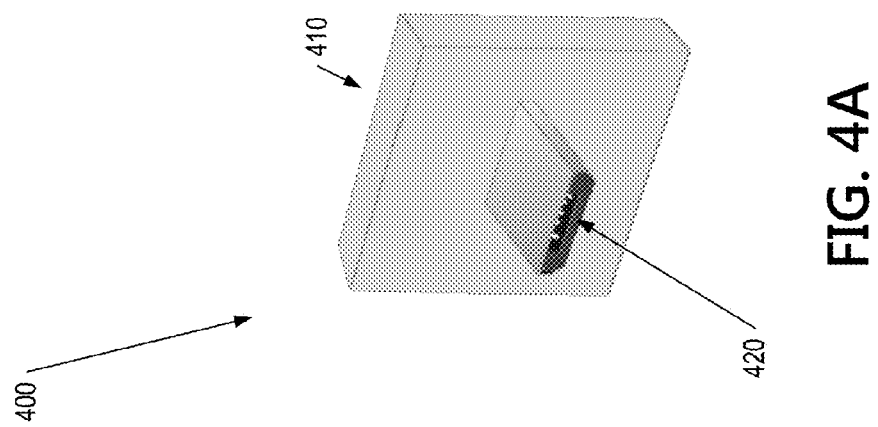

FIG. 4A illustrates an exemplary adaptor 400 insertable into the adaptor receiving region 210. Adaptor 400 may include a base 410 and a non-conductive tip 420. As discussed above, although the exemplary tip 420 illustrated in FIG. 4A is a microUSB male connector, other tips, jacks, male connectors, or the like may be present on the surface of base 410.

Figure 5A:
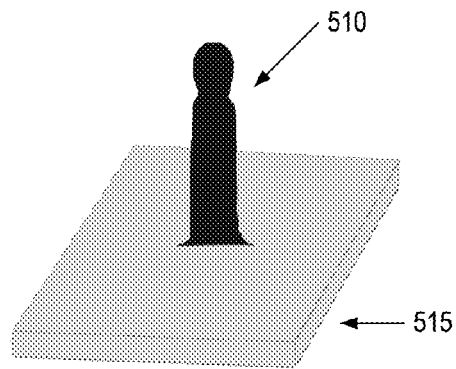
FIGS. 5A-C illustrate example additional and/or alternative adaptor tips according to one or more aspects described herein.
Figure 5B:
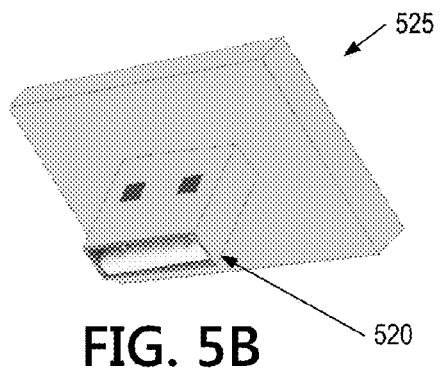
Figure 5C:
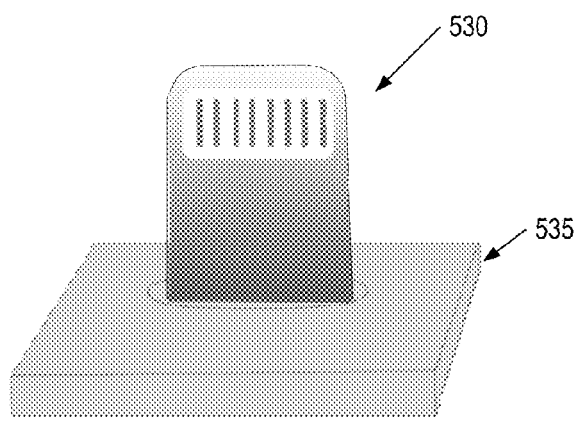

For example, as depicted in FIG. 5A, a tip 510 of an adaptor 515 may be a cylindrical TRS connector having a 3.5 mm diameter, or may be any other TS connector or TRRS connector of various diameters (e.g., 6.35 mm, 2.5 mm, or the like). As another example, as depicted in FIG. 5B, a tip 520 of an adaptor 525 may be in the shape of any USB connector, such as a USB-A connector or USB-B, USB-C, microUSB, miniUSB, or the like. As another example, as depicted in FIG. 5C, tip 530 of an adaptor 535 may be in the shape of any connector specific to and/or commonly associated with a device or manufacturer of devices (e.g., the 30-pin connector or Lightning connector found on devices manufactured by APPLE INCORPORATED, or the like). Any type of tip, jack, male connector, or so on, which may be positionable in a corresponding receptor, port, input, female connector or so on located on the mobile device may be used.

FIGS. 4B and 4C illustrate the insertion of adaptor 400 into adaptor receiving region 210, thereby forming assembly 430. FIGS. 4B and 4C are an isometric view of the adaptor receiving region with the external flash device to the right of the view (as indicated by illustrative screws 240, which are passed through the flat surface facing the view to couple the adaptor receiving region to the housing of the external flash device). As illustrated, the base of the adaptor 400 may be slid into a channel of adaptor receiving region 210 formed by left groove 215 and right groove 220. In some aspects, the adaptor receiving region 210 may present a complementary mating structure for one or more removable attachments (e.g., the adaptor 400). With additional reference to FIG. 3, in some aspects, the left grove 215 and right groove 220 may provide engagement with an adaptor insertable into the channel formed by the grooves and the flat surface through which the illustrative screws 240 have been passed. The left groove 215 and right groove 220 may not be parallel so as to provide frictional engagement with the adaptor base. Once the base is pressed into the adaptor receiving region to a position where the distance between left groove 215 and right groove 220 is less than the inserted width of the base 410, the non-parallel groves may inhibit movement of the base, thereby frictionally engaging the base with the adaptor receiving region (and consequently, because the adaptor receiving region is coupled with the external flash device, the base and tip may be coupled via the adaptor receiving region with the external flash device 200). In some aspects, the adaptor base may be insertable into the channel in multiple arrangements. For example, base 410 may be rotated so that the micro-USB connector depicted in FIGS. 4A-C is in a vertical orientation when inserted into the adaptor receiving region 210.

Other mechanisms to engage the base 410 with the adaptor receiving region are within the scope of the present disclosure, although not illustrated in FIGS. 2-4. For example, the adaptor receiving region 410 may have a lever-based locking mechanism. The lever may be moved in one direction to open the channel formed by the left groove 215 and right groove 220 and may be moved in an alternative direction upon presentation of a base of an adaptor, the mechanics of which may press the adaptor base into engagement with the adaptor receiving region. Snap members, magnets, thumb screws, bayonet couplings, or other locking mechanisms may be utilized in place of or in addition to press-fitting adaptor base 410 into the channel of the adaptor receiving region. As an example, in some aspects, left groove 215 and/or right groove 220 may have holes for engagement with a retractable spring-loaded pin or pins present on the adaptor base. Upon sliding of the adaptor into the adaptor receiving region, the spring-loaded pin or pins may encounter the holes, causing the spring to expand, thereby coupling the adaptor base to the adaptor receiving region by way of alignment and engagement of the pins with the holes.

Figures 6A, 6B:
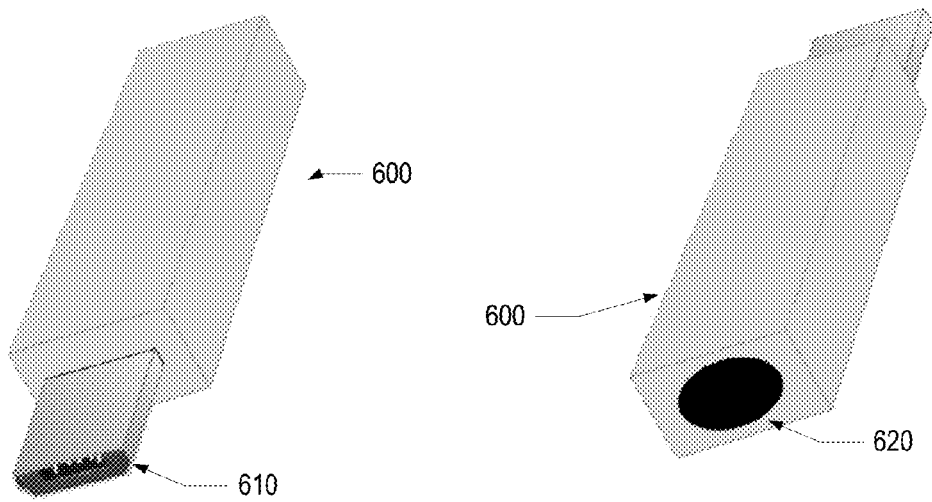
FIGS. 6A-B illustrate an additional or alternative adaptor mechanism according to one or more aspects described herein.

FIGS. 6A and 6B depict another adaptor according to one or more aspects described herein. The adaptor of FIGS. 6A and 6B may be used with external flash devices, such as external flash device 100 of FIG. 1 and other external flash devices. FIG. 6A presents an isometric view of an adaptor 600 with exemplary non-conductive tip 610 (a micro-USB tip). FIG. 6B presents a different isometric view of adaptor 600 with port 620. Tip 610 may be any of the non-conductive tips discussed above (e.g., any diameter of TRS, TS, or TRSS jack, and/or any mini-USB, USB-A, USB-B, USB-C, or Lightning connector, or any other jack, connector, or the like designed for insertion into a corresponding port or female connector). Port 620 may be a cylindrical TRS female connector having a 3.5 mm diameter, though may be any port capable of receiving an external flash device, in accordance with one or more aspects not illustrated in FIG. 6.

A user may insert into port 620 of adaptor 600 an external flash device having a tip. The tip may be a conductive tip. The presentation of non-conductive tip 610 to a corresponding port or female connector of the mobile device may result in no power being drawn by the external flash device, which would normally draw power as a result of its conductive tip. Accordingly, impact to a power source (e.g., battery) of the mobile device may negligible. In some aspects, circuitry may be present in adaptor 600 which may be controlled via a physical control (e.g., knob, switch, gate, relay or the like) or wirelessly controlled (e.g., via BLUETOOTH or other wireless technology such as IEEE 802.11 or IEEE 802.15, or the like) to temporarily allow current to flow from the port to the external flash device. This may be desired to recharge a battery of the external flash device without necessitating removal of the adaptor 600.

Figure 7:
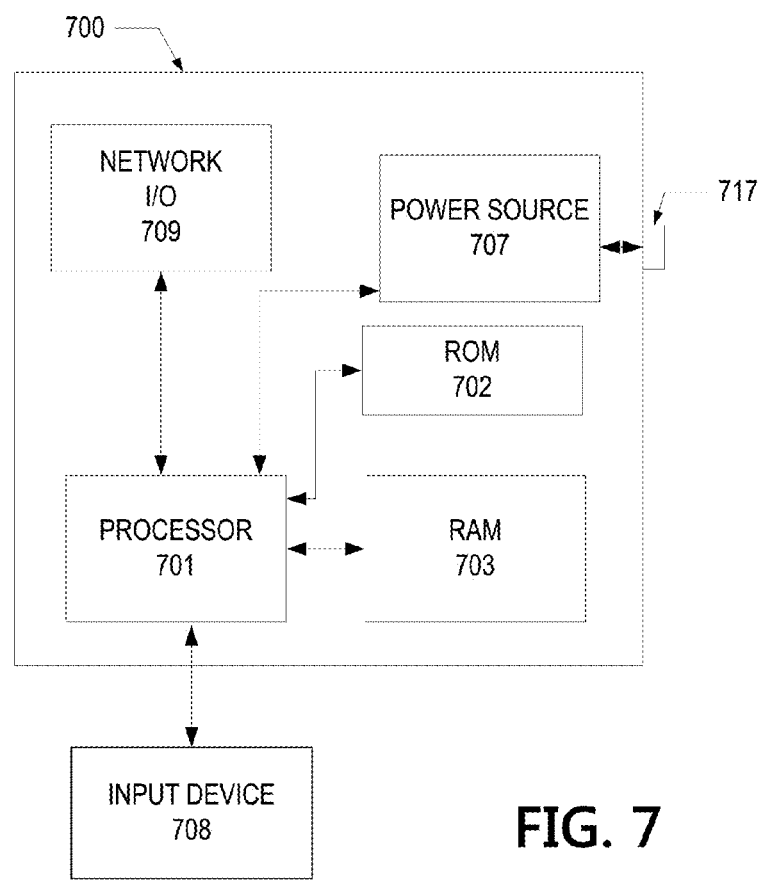
FIG. 7 illustrates a computing device according to one or more aspects described herein.

FIG. 7 schematically illustrates general hardware elements that may be used to implement any of the various computing devices discussed herein, including for example the various controllers discussed herein which may control the light sources of an external flash device and may be in communicative contact with applications running on the mobile device. In some aspects, the mobile device may include the general hardware elements discussed herein. The computing device 700 may include one or more processors 701, which may execute instructions of a computer program to perform any of the features described herein. The instructions may be stored in any type of computer-readable medium or memory, to configure the operation of the processor 701. For example, instructions may be stored in a read-only memory (ROM) 702 or random access memory (RAM) 703. The computing device 700 may also include one or more input interfaces 708 and one or more network interfaces, such as a network input/output (I/O) circuit 709. The network input/output circuit 709 may be a wired interface, wireless interface, or a combination of the two. The computing device 700 may also include a power source 707, which may be coupled to one or more physical control inputs (e.g., switches, knobs, touch-based inductive and/or capacitive inputs, or the like) such as toggle 717. Although only a connection between the processor 701 and the power source 707 is shown, in some aspects there may be connections between the power source and the other components (e.g., ROM 702, RAM 703, input interfaces 708, and/or network I/O 709) as well.

The FIG. 7 example is a hardware configuration, although the illustrated components may be wholly or partially implemented as software as well. Modifications may be made to add, remove, combine, divide, etc. components of the computing device 700 as desired. Additionally, the components illustrated may be implemented using basic computing devices and components, and the same components (e.g., processor 701, ROM storage 702, etc.) may be used to implement any of the other computing devices and components described herein. For example, the various components herein may be implemented using computing devices having components such as a processor executing computer-executable instructions stored on a computer-readable medium, as illustrated in FIG. 7. Some or all of the entities described herein may be software based, and may co-exist in a common physical platform.

Figure 8:
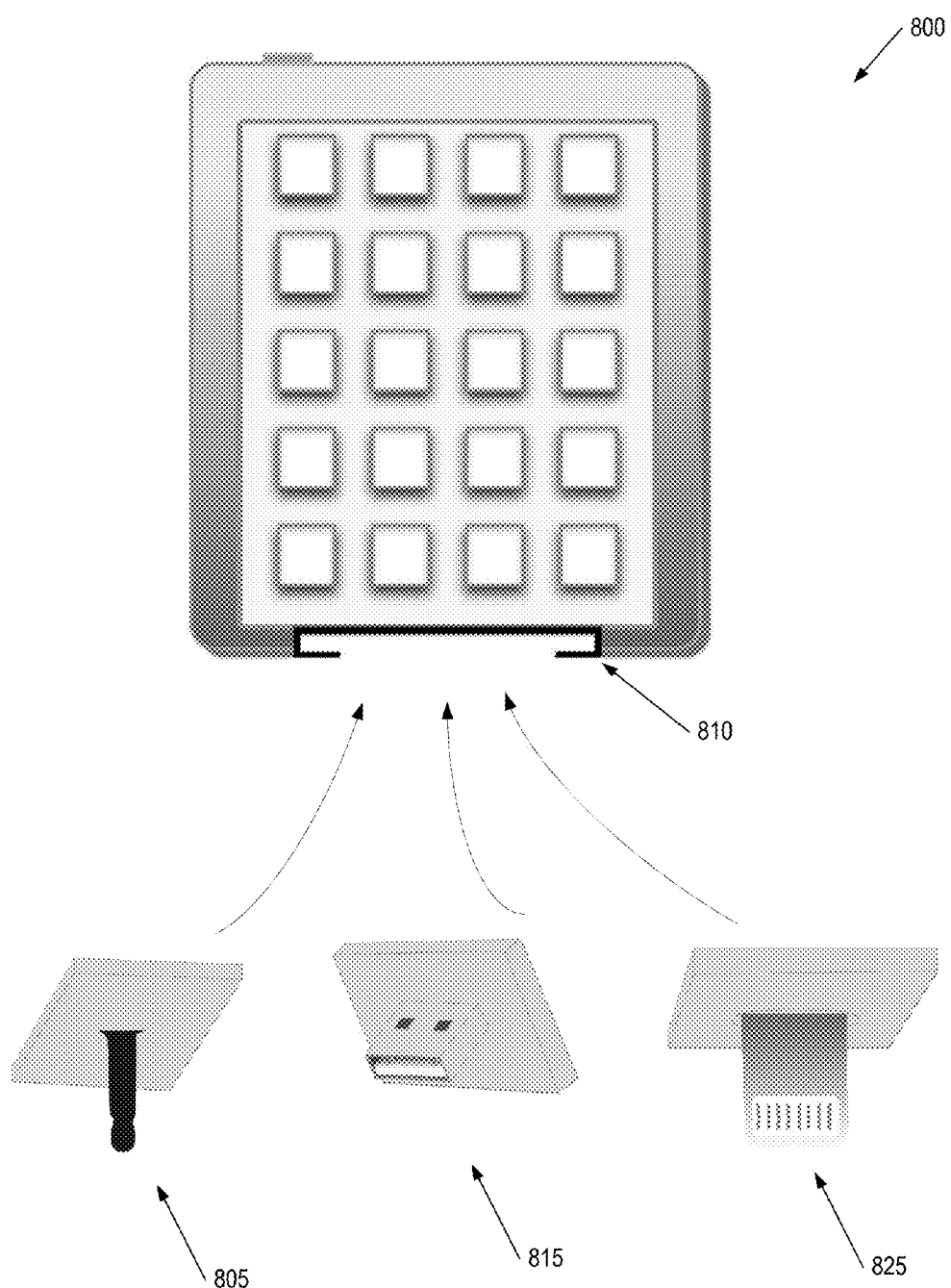
FIG. 8 illustrates a kit comprising an external flash device and a plurality of adaptors, according to one or more aspects described herein.

FIG. 8 illustrates a kit 800 comprising a device (e.g., device 100 or device 200) and one or more adaptors which may be inserted into an adaptor receiving region 810 (e.g., adaptor 805, adaptor 815, and adaptor 825). In some aspects, the kit 800 may include a plurality of adaptors each of which has a mating structure which is complementary to the adaptor receiving region. In some aspects, the kit 800 may include a plurality of adaptors which are compatible with a certain device or family of mobile devices (e.g., a model of mobile devices, a manufacturer of mobile devices, or the like).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A system comprising:
   an adaptor comprising a non-conductive tip positioned to extend from a surface of a base of the adaptor, wherein the non-conductive tip is dimensioned for insertion into and frictional engagement with a port of a mobile device; and
   a housing comprising:
      one or more light-emitting sources and a power source configured to power the one or more light-emitting sources, and
      an adaptor receiving region dimensioned to receive the base of an adaptor.

2. The system of claim 1, wherein the non-conductive tip comprises a shape of a Universal Serial Bus (USB) male connector.

3. The system of claim 2, wherein non-conductive tip comprises a shape of a micro-USB male connector.

4. The system of claim 2, wherein non-conductive tip comprises a shape of a Lightning connector.

5. The system of claim 2, wherein the adaptor receiving region comprises a first groove and a second groove, wherein an inner surface of the first groove is non-parallel with an inner surface of the second groove, wherein a first distance between the first groove and the second groove is wider than a width of the base, and wherein the width of the base is wider than a second distance between the first groove and the second groove.

6. The system of claim 2, wherein the non-conductive tip comprises a type of plastic.

7. The system of claim 2, wherein the non-conductive tip and the base are formed as a single piece.

8. The system of claim 7, wherein the housing is formed from a first material, and wherein the base and non-conductive type are formed from a second material.

9. An external flash device kit comprising:
   an external flash device comprising an adaptor receiving region; and
   a plurality of adaptors, each adaptor in the plurality comprising a base dimensioned to be received in the adaptor receiving region and a non-conductive tip positioned to extend from a first surface of the adaptor and dimensioned for insertion into and frictional engagement with a port of a mobile device.

10. The kit of claim 9, wherein a first adaptor in the plurality of adaptors comprises a non-conductive audio jack.

11. The kit of claim 10, wherein a second adaptor in the plurality of adaptors comprises a non-conductive tip having a shape of a micro-Universal Serial Bus (USB) male connector.

12. The kit of claim 10, wherein a second adaptor in the plurality of adaptors comprises a non-conductive tip having a shape of a Lightning connector.

13. The system of claim 8, wherein the first material comprises a first type of plastic, and wherein the second material comprises a second type of plastic different from the first type.

14. The kit of claim 9, wherein a first adaptor in the plurality of adaptors comprises a non-conductive tip and a base formed as a single piece.

15. The kit of claim 9, wherein a first adaptor in the plurality of adaptors comprises a non-conductive tip of a type of plastic.

16. The kit of claim 9, wherein a first adaptor in the plurality of adaptors comprises a housing formed from a first material and a non-conductive tip formed from a second material.

17. The kit of claim 16, wherein the first material comprises a first type of plastic, and wherein the second material comprises a second type of plastic different from the first type.

* * * * *